H. W. HASKELL.
TOOL HOLDER.
APPLICATION FILED MAR. 23, 1908.
935,977.
Patented Oct. 5, 1909.
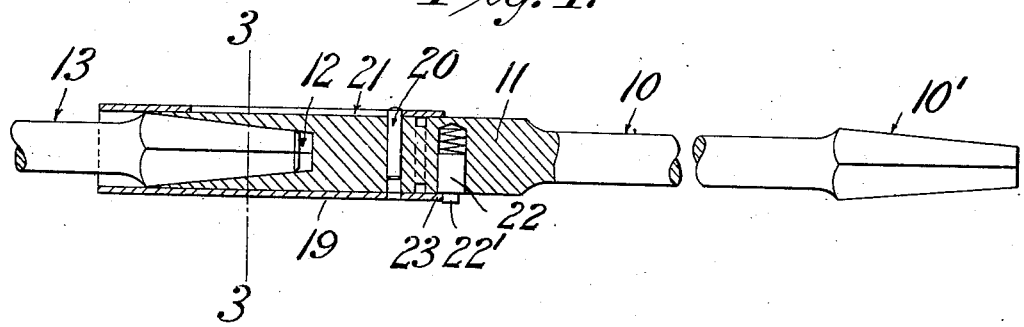
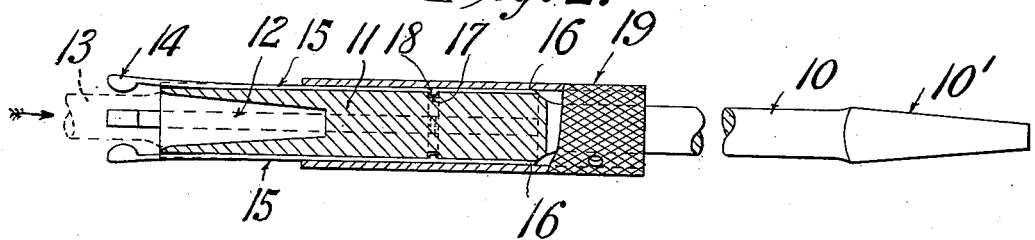
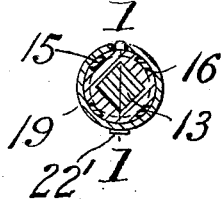
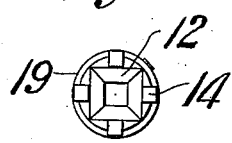
WITNESSES:
H. L. Sprague
R. M. Mowry
INVENTOR,
Henry W. Haskell.
BY
ATTORNEY.

UNITED STATES PATENT OFFICE.

HENRY W. HASKELL, OF HOLYOKE, MASSACHUSETTS.

TOOL-HOLDER.

935,977.  Specification of Letters Patent.  Patented Oct. 5, 1909.

Application filed March 23, 1908. Serial No. 422,654.

*To all whom it may concern:*

Be it known that I, HENRY W. HASKELL, a citizen of the United States of America, and resident of Holyoke, in the county of Hampden and State of Massachusetts, have invented certain new and useful Improvements in Tool-Holders, of which the following is a full, clear, and exact description.

This invention relates to tool-holders, and more especially to that class thereof which are employed to hold the squared ends of tools such as augers, bits, etc., and it has for its object the provision of an improved device of this character which will hold the tool firmly and yet is adapted for rapid manipulation to grip or to release the tool.

My invention has, furthermore, for its object the combination, with the tool holding jaws, of a sliding non-rotatable sleeve whereby the jaws are caused to grip the tool, and which is positively held in its operative position.

In the accompanying drawings, in which similar characters denote similar parts,—Figure 1 is a longitudinal section of my improved tool-holder, showing the jaw-operating sleeve held in its forward or active position. Fig. 2 is a view similar to Fig. 1 and shows the jaws released, the sleeve being in its retracted position. Fig. 3 represents a section on line 3—3, Fig. 1, and Fig. 4 is an end view of the device, looking in direction of arrow, of Fig. 1.

In the drawings,—10 denotes the shank of the tool-holder, which is herein shown as an extension-device adapted to be, in turn, used in a bit-brace or similar article and has, for this reason, its end squared, as shown at 10′. At its other end, the rod or shank 10 is provided with an enlarged head or chuck-portion 11 having a tapered square recess 12 adapted to receive the usual standard-shape end of the auger or bit 13.

Means are provided for holding the tool 13 within the recess 12, these means consisting in the present instance of a series of jaws 14 formed at the ends of resilient blades 15 which are seated in grooves 16 provided therefor in the body portion 11 which has also a preferably-annular groove 17 adapted to receive a projection or lip 18 of each jaw blade 15 which is thus firmly held against movement relative to the body 11. The jaw blades 15 are retained within the grooves 16, by means of the jaw-actuator or sleeve 19 which is mounted for longitudinal movement on the body 11, so as to contract the jaws (when in forward position), or to release their ends from the tool (when in retracted position), as shown in Fig. 2. The movement of the sleeve is limited in both directions by a pin 20 held in the body 11 and riding in a slot 21 of the sleeve, and in order to prevent accidental movement of the sleeve from its forward or operative position (see Fig. 1), I employ a spring-actuated plunger 22, the outer end 22′ of which is somewhat smaller to form a shoulder 23 which is still within the reach of the rear end of the sleeve 19 when the latter is in its extreme forward position as limited by the pin 20 engaging the end wall of the slot 21.

From the foregoing it will be readily understood that after pressing the plunger 22 inward until the outer surface of the projection 22 is substantially flush with the inside of the sleeve 19, the latter may be slipped to release the front ends of the jaws 14, thus leaving the tool free to be withdrawn, or inserted.

I claim:—

1. A tool holder, comprising in combination with a socketed shank having an annular groove, a series of resilient jaws fitted to said shank so as to be flush with its surface when compressed, lips carried by said jaws and engaging said annular groove, a longitudinally slotted sleeve snugly fitting said socketed shank and inclosing said jaws, said sleeve being axially slidable on said shank, a pin entered in said shank and projecting into said slot to limit the movement of said sleeve, and a plunger pin also entered into said shank to project behind and lock said sleeve when in its forward position.

2. A tool holder comprising in combination with a socketed shank having an annular groove, a series of resilient jaws fitted to said shank so as to be flush with its surface when compressed, lips carried by said jaws and engaging said annular groove, a longitudinally slotted sleeve snugly fitting said socketed shank and inclosing said jaws, said sleeve being axially slidable on said shank, a pin entered in said shank and projecting into said slot to limit the movement of said sleeve, and a plunger pin also entered into said shank to project behind and lock said sleeve when in its forward position, said plunger comprising a shouldered pin, a spring normally pushing said pin outwardly, said pin and sleeve being so interengaged when the sleeve is pushed forward that they coact to hold one another in place.

Signed by me in presence of two subscribing witneses.

HENRY W. HASKELL.

Witnesses:
G. R. DRISCOLL,
WM. S. BELLOWS.